United States Patent Office 3,637,604
Patented Jan. 25, 1972

3,637,604
SHAPED ARTICLES MADE FROM POLYCAPRO-LACTAMS CONTAINING AN ORGANOSILICON COMPOUND AS AN ANTIELECTROSTATIC AGENT
Joachim Schneider, Krefeld-Urdingen, Herbert Gröschel, Harry Kubitzek, and Günther Nawrath, Dormagen, and Hans Rudolph, Krefeld-Bockum, Germany, assignors to Farbenfabriken Bayer Aktiengesellschaft, Leverkusen, Germany
No Drawing. Filed Dec. 19, 1968, Ser. No. 785,369
Claims priority, application Germany, Dec. 28, 1967, P 16 94 235.1
Int. Cl. C08g 41/04, 47/10
U.S. Cl. 260—78
2 Claims

ABSTRACT OF THE DISCLOSURE

Shaped articles which are antielectrostatic and which are made from high molecular weight polycaprolactams containing an organosilicon compound as an antielectrostatic agent.

---

This invention relates to antielectrostatic shaped articles made from high polymers, which contain, as anti-static agents, compounds containing polyglycol ether radicals attached through an Si—O bond.

Shaped articles made from synthetic, semi-synthetic and natural materials have frequently been known to develop an electrostatic charge, both during processing and during practical application. This undesirable phenomenon is attributable to the charge separation of electrically neutral particles, through contact, friction and so on. The dissipation of electrostatic charges is governed by the electrical surface resistance and hence by the electrical surface conductivity. Any reduction in electrical surface resistance, that is to say an improvement in the electrical surface conductivity, very quickly eliminates these electrostatic charges and prevents them from accumulating on the surface of the particular shaped article.

It is known that the presence of polyethylene glycol ethers in shaped articles of synthetic polymers largely prevents electrostatic charging (cf. Belgian patent specification No. 631,199). Unfortunately, the effect obtained is unable to withstand washing, that is to say after only a few washes the electrical surface resistance of shaped articles antistatically finished in this way is almost as high as that of untreated shaped articles.

It has now been found that the substances in which at least one radical with a linear or branched chain of from 6 to 26 carbon atoms, is attached through Si—O bonds to at least one radical containing a polyglycol ether chain of the structure $$\left[ \begin{array}{c} CH-CH_2-O \\ | \\ R \end{array} \right]_n -H$$

where $n$ represents a number from 5 to 250 and R represents hydrogen or methyl, produce a substantially wash-resistant antielectrostatic effect in high polymers.

The antielectrostatically active compounds correspond to the general formula

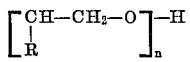

in which $R_1$ represents an alkyl radical with from 6 to 26 carbon atoms, $R_2$ and $R_3$ each represents a lower alkyl radical, the radical —O—$R_1$ or Y, and Y represents the radical

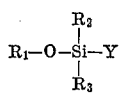

where $R_4$ represents hydrogen or methyl and $n$ is an integer from 5 to 250.

It is preferred to use silicon-containing compounds such as can be obtained by reacting a chlorosilicon compound, such as silicon tetrachloride or methyl trichlorosilane, with a fatty alcohol containing from 8 to 20 carbon atoms and a polyethylene glycol of molecular weight 200 to 5000, as antielectrostatically active substances for shaped articles made from high polymers, preferably polyamides.

The compounds are prepared by known methods.

For example, the chlorosilicon compound may be initially reacted with the fatty alcohol and then with the polyglycol ether in an inert solvent, such as toluene. The solvent may then be removed by distillation, optionally in vacuo. The residue contains the compounds used in accordance with the invention.

The following are examples of suitable fatty alcohols: 2-ethyl-n-hexanol, n-octan-1-ol, nonan-1-ol, decan-1-ol, dodecan-1-ol, hexadecan-1-ol, octadecan-1-ol and octadec-9-en-1-ol. Suitable polyglycol ethers include, for example, the addition products of ethylene oxide and/or propylene oxide with ethylene glycol, propylene glycol, methanol, ethanol, propanol and butanol.

The compounds used in accordance with this invention may be added to the polyamide as antielectrostatic agents either before, during or after polymerisation of the polyamide-forming substances. However, it is also possible uniformly to distribute the antielectrostatic substances, optionally in the form of concentrates, for example in the corresponding polyamides, in the polyamides during or after polymerisation either continuously or at intervals by means of suitable mixer units such as stirrers, kneaders, screws or extruders.

Apart from the aforementioned polyamides, examples of suitable high polymers include polyesters, polyolefins, polyacrylates, polyvinyl chlorides, polyvinyl acetals, polyvinylidenes, polystyrenes, polycarbonates, cellulose esters, their mixtures and copolymers.

The polymers may also contain the usual additives such as pigments, dyes, light and heat stabilisers, optical brighteners, fillers such as glass or asbestos fibres, plasticisers, mould-release agents, chain terminators, crystallisation stimulators, diffusion-promoting agents and so on. Polymers containing these antielectrostatically active compounds may be converted into shaped articles such as chemical materials, films, bristles, fibres, filaments, or products obtained from them, such as woven or knitted fabrics.

The compounds used in accordance with the invention are added in quantities of from 0.2 to 30% by weight and preferably in quantities of from 0.5 to 20% by weight.

Preparation of the antielectrostatically active compounds used in accordance with the invention:

SUBSTANCE A 980 g. of stearyl alcohol dissolved in 1.5 litres of toluene were added over a period of 20 minutes at 10 to 15° C. to 392 g. of trichloromethyl silane in 1 litre of toluene. The mixture was then heated for 2 hours at 65° C., after which 1120 g. of polyethylene glycol ether of molecular weight 400 were added all at once at 20° C. This was followed by heating for 1 hour at 65° C., after which the solvent was distilled off up to a sump temperature of 200° C. the rest of the volatile components being removed at 200° C./12 torr.

A colourless residue (Substance A) is obtained in a quantity of 2180 g.

SUBSTANCE B 210 g. of stearyl alcohol in solution in 400 ml. of toluene were added over a period of 30 minutes at 10 to 15° C. to 84 g. of trichloromethyl silane in 200 ml. of toluene. The mixture was then heated for 2 hours at 65° C. after which 2400 g. of polyethylene glycol of molecular weight 4000 were added as quickly as possible at 20° C. The reaction product was then worked up in the same way as Substance A.

A colourless residue (Substance B) was obtained in a yield of 2640 g.

The following examples illustrate more particularly the invention.

Example 1

110 parts by weight of Substance A were added dropwise over a period of 1 hour to a prepolymer of 396 parts by weight of ω-caprolactam, 44 parts by weight of ω-aminocaproic acid and 22 parts by weight of benzoic acid. On completion of the polycondensation reaction, the reaction mixture was spun unto a filament 2.0 mm. thick which was subsequently cut up into pieces. The resulting pieces or chips were mixed with conventional polyamide chips so that Substance A was present in a concentration of 2% by weight. After spinning through a screwtype melt spinning machine, mouldings or shaped articles were produced from the resulting filament and the chips produced therefrom. After conditioning at 23° C./50% relative humidity, the electrical surface resistance of these mouldings as measured with a Stahl-Schneiden electrode according to DIN 53596, amounted to $1.1 \times 10^{11}$ ohms; a comparison moulding without any additives had an electrical surface resistance of $4.1 \times 10^{12}$ ohms.

Example 3

Substance A was continuously introduced by means of a metering pump into a polyamide melt accompanied in a screw-type melt spinning machine. The rotational speed of the screw was adjusted so as to provide an optimum mixing effect. Substance A was introduced in a total quantity of 2% by weight. After a 2.0 mm. thick wire or filament had been spun, it was cut up into chips. After conditioning at 23° C./50% relative humidity, mouldings prepared from these chips had an electrical surface resistance of $2.0 \times 10^{11}$ ohms. The electrical surface resistance of a comparison moulding without any additives amounted to $4.1 \times 10^{12}$ ohms.

Example 4

The chips obtained in accordance with Example 3 were spun as described in Example 2. Electrical surface resistance

| | Ohms |
|---|---|
| After one wash | $8.3 \times 10^{10}$ |
| After several washes | $2.7 \times 10^{11}$ |

The electrical surface resistance of a comparison specimen amounted to $9.4 \times 10^{12}$ ohms after one wash and to $8.4 \times 10^{12}$ ohms after several washes.

If Substance B is used instead of Substance A in the preceding examples, highly satisfactory results are again obtained. By contrast, unfavourable results are obtained with polyethylene glycols in accordance with Belgian patent specification No. 631,199.

The test results are set out in the following table:

TABLE

| Substance | Addition, percent by weight | Process according to example | Moulding | Staple fibre after first wash | Staple fibre after several washes |
|---|---|---|---|---|---|
| A | 2 | 1 | $1.1 \times 10^{11}$ | | |
|   |   | 2 |  | $9.9 \times 10^{10}$ | $3.6 \times 10^{11}$ |
|   |   | 3 | $2.0 \times 10^{11}$ | | |
|   |   | 4 |  | $8.3 \times 10^{10}$ | $2.7 \times 10^{11}$ |
|   | 4 | 1 | $9.3 \times 10^{10}$ | | |
|   |   | 2 |  | $6.0 \times 10^{10}$ | $3.0 \times 10^{11}$ |
|   |   | 3 | $4.7 \times 10^{10}$ | | |
|   |   | 4 |  | $7.1 \times 10^{10}$ | $2.5 \times 10^{11}$ |
| B | 2 | 1 | $2.4 \times 10^{11}$ | | |
|   |   | 2 |  | $8.2 \times 10^{10}$ | $2.5 \times 10^{11}$ |
|   |   | 3 | $9.0 \times 10^{10}$ | | |
|   |   | 4 |  | $9.4 \times 10^{10}$ | $5.4 \times 10^{11}$ |
|   | 4 | 1 | $8.2 \times 10^{10}$ | | |
|   |   | 2 |  | $6.1 \times 10^{10}$ | $2.1 \times 10^{11}$ |
|   |   | 3 | $8.7 \times 10^{10}$ | | |
|   |   | 4 |  | $7.8 \times 10^{10}$ | $2.2 \times 10^{11}$ |
| Polyethylene glycol molecular weight 10,000 according to Belgian patent Specification No. 671,199. | 2 | 1 | $3.6 \times 10^{12}$ | | |
|   |   | 2 |  | $3.8 \times 10^{12}$ | $4.0 \times 10^{12}$ |
|   |   | 3 | $1.4 \times 10^{12}$ | | |
|   |   | 4 |  | $1.4 \times 10^{21}$ | $3.2 \times 10^{12}$ |
|   | 4 | 1 | $8.4 \times 10^{11}$ | | |
|   |   | 2 |  | $9.1 \times 10^{11}$ | $2.7 \times 10^{12}$ |
|   |   | 3 | $2.6 \times 10^{11}$ | | |
|   |   | 4 |  | $2.4 \times 10^{12}$ | $1.8 \times 10^{12}$ |
| Comparison (no additives) |  | 1 | $4.1 \times 10^{12}$ | $9.4 \times 10^{12}$ | $8.4 \times 10^{12}$ |

Example 2

Chips prepared in accordance with Example 1 were spun into filaments in a screw-type melt spinning machine and the resulting filaments were stretched in the usual way. The final denier of each filament amounted to 15 den. The filaments were then cut to a staple length of 100 mm. The staple fibres thus obtained were washed with a fine detergent at 60° C. in an automatic washing machine with five rinsing cycles, and then dried in a tumbler drier for 30 minutes at 80° C. After conditioning at 23° C./50% relative humidity, the electrical surface resistance amounted to $9.9 \times 10^{10}$ ohms after one wash and to $3.6 \times 10^{11}$ ohms after several washes. The electrical surface resistance of a comparison specimen amounted to $9.4 \times 10^{12}$ ohms after one wash and to $8.4 \times 10^{12}$ ohms after several washes.

What we claim is:

1. A shaped article which is antielectrostatic and is made from a composition comprising a synthetic high molecular weight polycaprolactam and, as the antielectrostatic agent, from 0.2 to 30% by weight, based on the polycaprolactams of a silicon compound of the formula

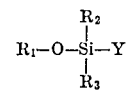

wherein $R_1$ is an alkyl of 6–26 carbon atoms, each of $R_2$ and $R_3$ is lower alkyl, $-OR_1$, or $-Y$ wherein Y has the formula

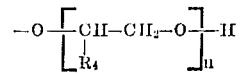

wherein $R_4$ is hydrogen or methyl and $n$ is an integer from 5 to 250.

2. A shaped article of claim 1 wherein the article is in the form of a film, a bristle, a fiber, or a filament.

References Cited

UNITED STATES PATENTS

| | | | |
|---|---|---|---|
| 2,916,461 | 12/1959 | Krantz | 260—2 |
| 3,341,501 | 9/1967 | Hedrick et al. | 260—78 |
| 3,388,104 | 6/1968 | Crovatt | 260—78 |
| 3,461,107 | 8/1969 | Hayes | 260—78 |

WILLIAM H. SHORT, Primary Examiner

L. M. PHYNES, Assistant Examiner

U.S. Cl. X.R.

260—29.1 B, 92.8 R, 93.5 A